United States Patent [19]

Ross

[11] 4,199,253
[45] Apr. 22, 1980

[54] METHODS AND SYSTEMS FOR THREE-DIMENSIONAL MEASUREMENT

[75] Inventor: Joseph A. Ross, Fort Salonga, N.Y.

[73] Assignee: Solid Photography Inc., Melville, N.Y.

[21] Appl. No.: 897,572

[22] Filed: Apr. 19, 1978

[51] Int. Cl.² .................. G01C 3/08; G01C 11/12; G03B 35/00
[52] U.S. Cl. .................. 356/5; 354/110; 354/113; 356/376
[58] Field of Search .................. 358/95; 356/5, 376; 354/113, 110; 352/39

[56] References Cited

U.S. PATENT DOCUMENTS

| | | | |
|---|---|---|---|
| 3,181,145 | 4/1965 | Towle et al. | 343/7 |
| 3,409,368 | 11/1968 | Fernandez | 356/5 |
| 3,446,555 | 5/1969 | Kahn | 356/5 |
| 3,527,533 | 9/1970 | Hook et al. | 356/5 |
| 3,649,124 | 3/1972 | Takaoka et al. | 356/5 |
| 3,669,541 | 6/1972 | Duguay | 356/5 |
| 3,682,064 | 8/1972 | Matsunaga et al. | 354/113 |
| 3,682,553 | 8/1972 | Kapany | 356/5 |
| 3,743,418 | 7/1973 | Heflinger | 356/5 |
| 3,743,419 | 7/1973 | Skagerlund | 356/5 |
| 3,866,052 | 2/1975 | Di Matteo et al. | 250/558 |
| 3,885,240 | 5/1975 | Jensen | 343/5 DP |
| 3,951,549 | 4/1976 | Fowler et al. | 356/5 |
| 3,959,641 | 5/1976 | Miller, Jr. et al. | 356/5 |

*Primary Examiner*—S. C. Buczinski
*Attorney, Agent, or Firm*—Watson, Leavenworth, Kelton & Taggart

[57] ABSTRACT

In a method for defining the spatial location of points comprising an object surface, pulsed radiant energy is projected onto the object surface and collections of object-reflected radiant energy are conducted separately in accordance with respective different time patterns which are mutually overlapping in time.

13 Claims, 7 Drawing Figures

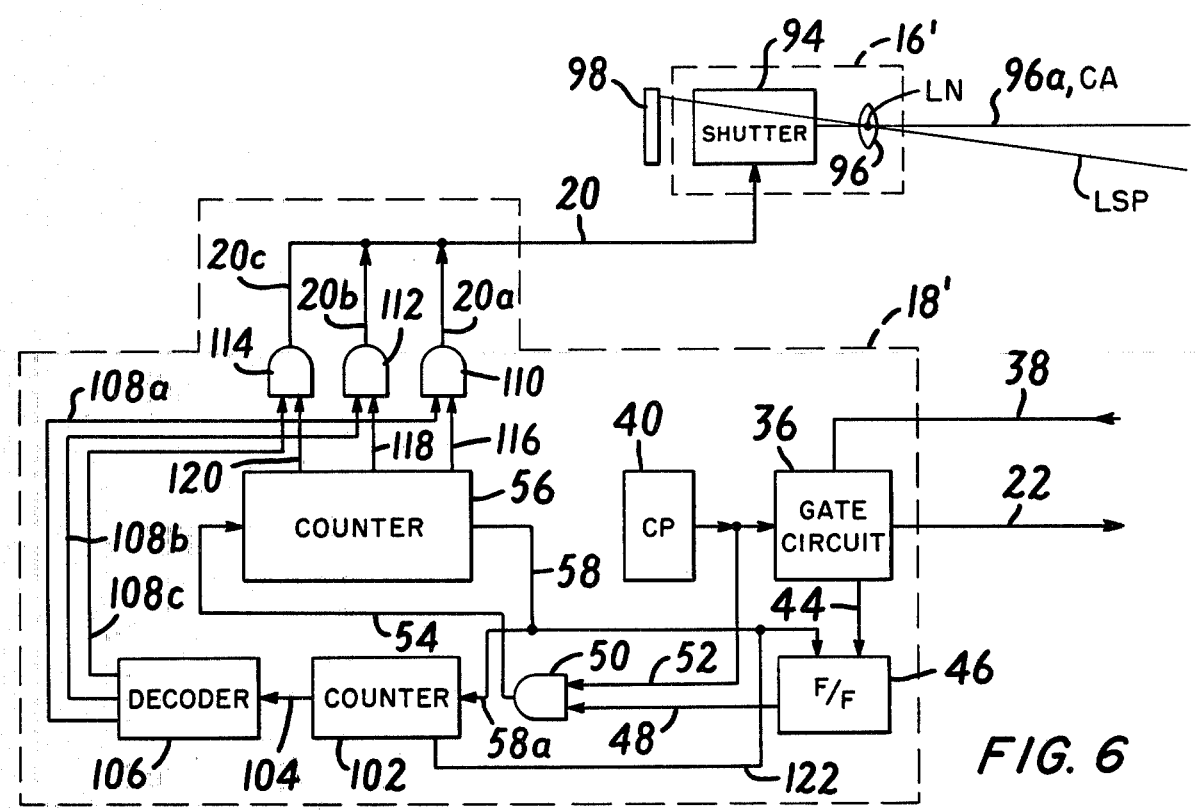
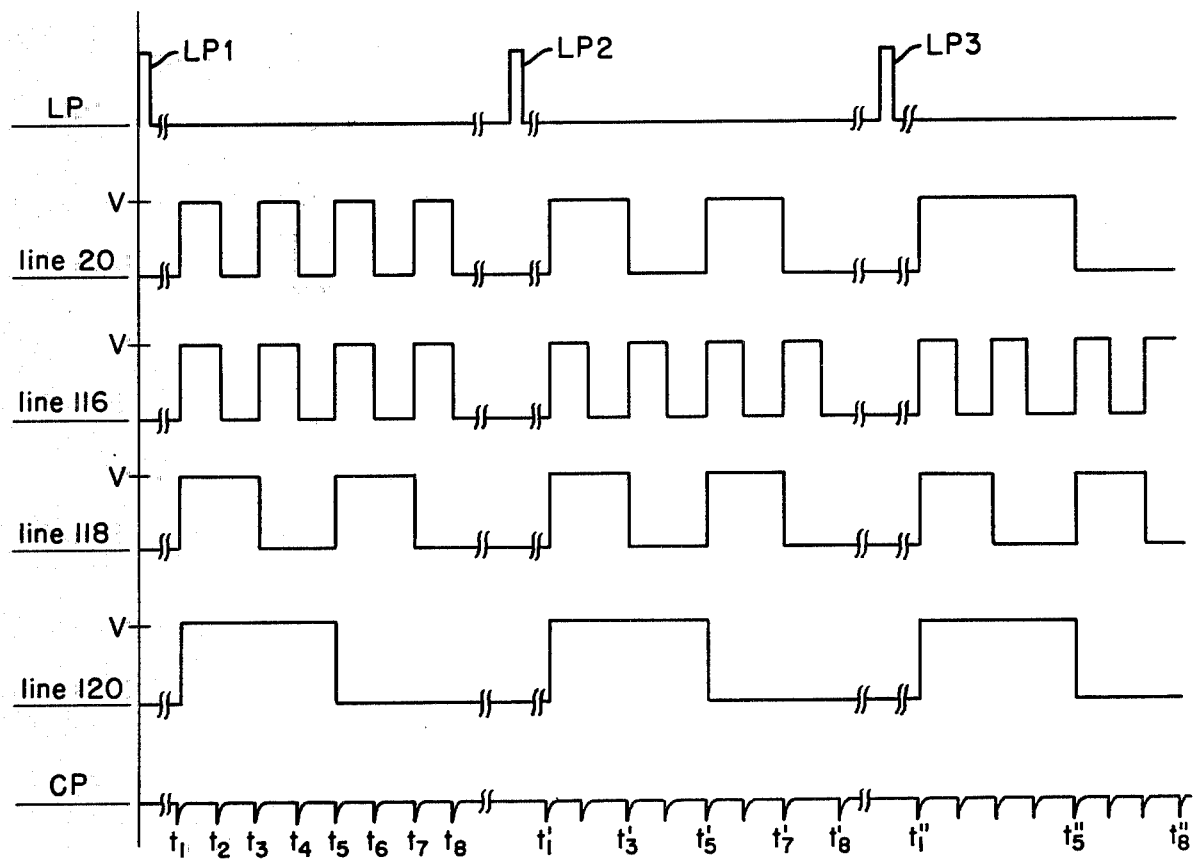
FIG. 6
FIG. 7

METHODS AND SYSTEMS FOR THREE-DIMENSIONAL MEASUREMENT

FIELD OF THE INVENTION

This invention relates generally to methods and systems for three-dimensional measurement and pertains more particularly to methods and systems for determining the positional locations in three dimensions of radiant energy-reflective objects and surfaces thereof.

BACKGROUND OF THE INVENTION

In U.S. Pat. No. 3,866,052, commonly-assigned herewith, methods for use in defining the spatial location of a point on an object surface involve the practice of projecting radiant energy onto the surface through digital mask structure, i.e., masks having respectively discrete energy transmissive and energy non-transmissive extents. In the preferred practice of the '052 patent, differently configured masks establish diverse irradiated segments of the projection field and are used successively. Records made in corresponding succession are examined to identify those records in the succession of records which contain, or do not contain, a representation of the illumination of each surface point of interest. Digital signal patterns are generated from the record succession unique for surface points which are in different projection field segments. These signals, together with information as to the positional location of surface points in the two-dimensional records and the spatial location of the recording lens node enable transition from two-dimensional data to spatial position determination. The lens node and record positional information establish a line of sight to the surface point and the digital signals identify the location of such point along the line of sight.

Another practice for attaining the purpose of the '052 patent is set forth in copending application Ser. No. 838,835, filed on Oct. 3, 1977 and also commonly assigned herewith. In such alternative practice, radiant energy is projected into the projection field with the intensity, or other characteristic, of the radiant energy conforming successively per projection to plural different patterns, e.g., sine, cosine or like functions, along an axis transverse to the direction of the projection field. Records are made of object-reflected radiant energy and the line of sight distance to the object surface point is derived from the records as fully discussed in such '835 application.

The foregoing practices and other practices discussed in the '052 patent and '835 application rely upon the projection of patterned radiant energy and use of masks or like energy patterning measures. In such aspect, these practices require measures of care in mask preparation, placement and use. These highly efficient practices have correspondingly increased costs in implementation and use.

Prior art patents are noted and discussed in the statement to be filed herein pursuant to 37 CFR 1.97 and 1.98.

SUMMARY OF THE INVENTION

It is an object of the present invention to provide improved methods and systems for use in radiant energy examination and spatial definition of object surfaces.

A more particular object of the invention is to provide practices reaching the results of the '052 patent and '835 application with improved efficiency.

In attaining the foregoing and other objects, the subject invention provides a practice wherein unpatterned radiant energy is projected as a discrete pulse onto the surface of an object. Radiant energy reflected into the lens field of view of a collector is separately collected, the collections being conducted in accordance with respective different time patterns which are mutually overlapping whereby a uniqueness attends energy reflected from surface portions of the object being examined, enabling identification of the spatial coordinates thereof.

In contrast to the effective encoding of planes of a volume by issuing patterned radiation into the volume in the '052 patent and '835 application, in the subject invention codes are used to encode the round-trip travel time of a light pulse to and from an object in a volume into which is issued blanket or unpatterned radiant energy. Like result attends the different practices whereby subdivisions of the volume are identified as to spatial location.

In one practice under the invention, plural shutters are cycled in accordance with respective different time patterns by operating the shutters at respective different rates in a common time frame following issuance of a pulse of light onto an object. The shutter-cycling rate and timing of mutual operation of shutters are controlled such that energy reflected from a plurality of zones of the object is conducted selectively through participating shutters. In an alternative disclosed practice, a single shutter is employed and is cycled in accordance with respective different time patterns by operating the shutter at respectively different rates following issuance of successive light pulses, cycling rates being such that the same result as above attends the practice although the selective energy collections take place in different time frames.

The foregoing and other objects and features of the invention will be further evident from the following detailed discussion of preferred embodiments and practices thereof and from the drawings wherein like reference numerals identify like elements throughout.

DESCRIPTION OF THE DRAWINGS

FIG. 6 is a further embodiment of radiant energy transmitting and collecting apparatus for use in practicing the invention.

FIG. 7 is a timing diagram indicative of operation of the FIG. 6 apparatus.

DESCRIPTION OF THE PREFERRED EMBODIMENTS

Figure 1:
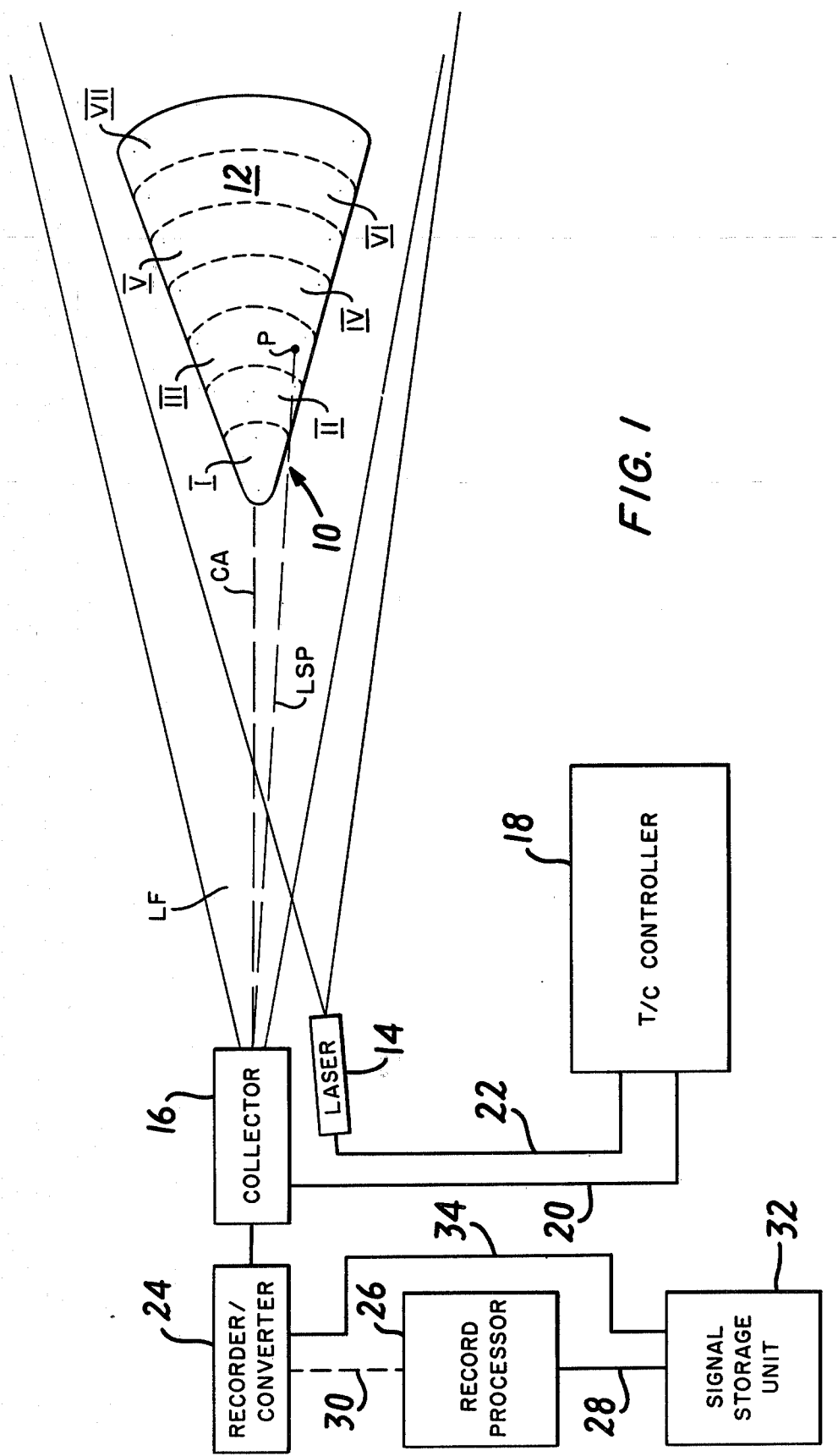
FIG. 1 is a schematic illustration of an object in association with a radiant energy projector and related apparatus according with the invention.

Referring to FIG. 1, object 10 is shown, for convenience of explanation, as a conical body with surface 12. In mutually fixed disposition are radiant energy source 14 and radiant energy collector 16. In preferred practice in accordance with the invention, the employed radiant energy is light energy. Source 14 may suitably comprise a laser or lower intensity light source and unit 16 may comprise a shutter or group of shutters suitably controlled together with source 14 by transmit/collect (T/C) controller 18 over lines 20 and 22. Radiant energy conducted through unit 16 is applied to recorder/converter 24. Records produced by unit 24 may be examined by record processor 26 for generation of electrical signals on line 28 indicative of their contents. As indicated by broken line 30 between recorder 24 and processor 26, the records may be examined "off-line" from system operation, as discussed below in connection with FIG. 5. Signals on line 28 are retained in signal storage unit 32 for object reconstruction, object location or like purpose.

Where unit 24 is chosen to be a conversion unit, i.e., directly to generate output electrical signals responsively to radiant energy conducted through collector 16, unit 24 conveys such signals over line 34 to storage unit 32.

Radiant energy collector 16 defines a lens field of view LF which is desirably inclusive of the entirety of object 10. Field LF need be inclusive of at least that portion of the object surface including object points whose spatial location is to be determined. Source 14 is oriented with respect to collector 16 and object 10 such that the entirety of the object or such object surface portion is illuminated by the source. As will be further understood from detailed discussion below of embodiments of T/C controller 18 and collector 16, radiant energy reflected by the object into the lens field of view is collected separately by collector 16, such separate collections being conducted periodically at mutually different rates and mutually overlapping in time.

Figure 2:
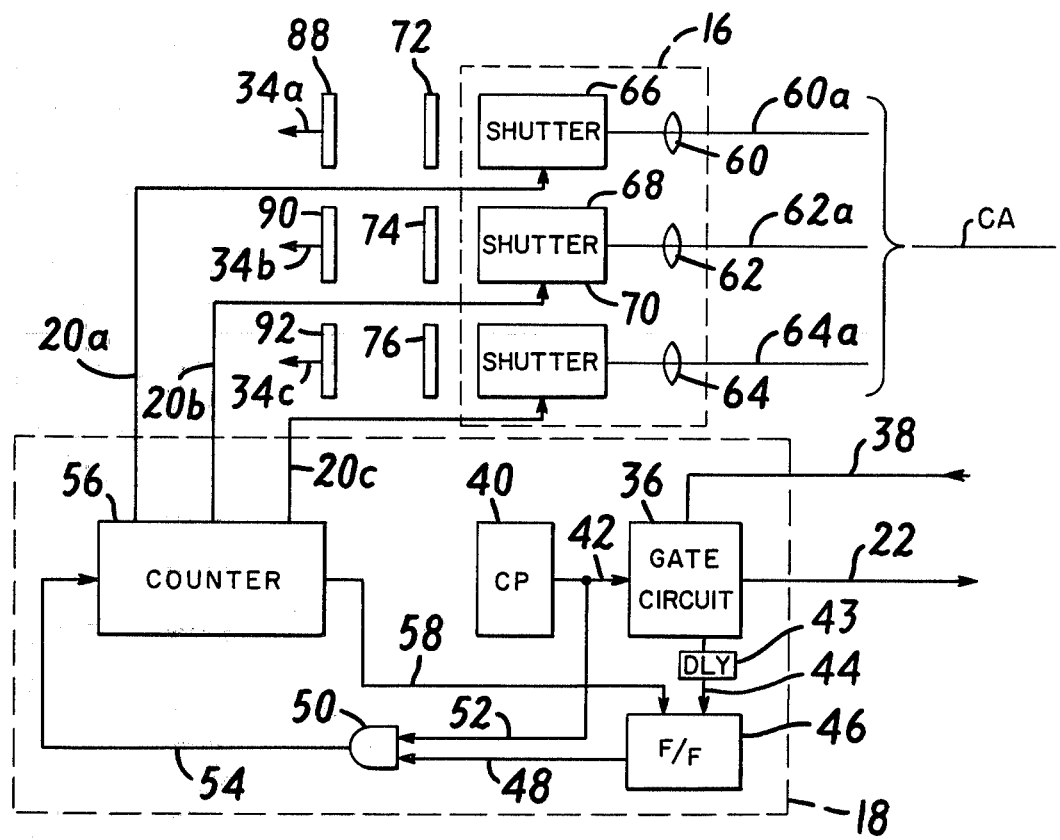
FIG. 2 is a block diagram of a first embodiment of radiant energy transmitting and collecting apparatus for use in practicing the invention.

Referring to FIG. 2, a preferred composite embodiment of collector 16 and T/C controller 18 of FIG. 1 is shown in block diagrammatic form. Controller 18 includes a gate circuit 36 which is enabled by a start input signal pulse on line 38, as by operation of a start switch, to gate a clock pulse from CP generator 40 over line 42 both to line 22, to serve as a trigger for light source 14 (FIG. 1), and via delay circuit (DLY) 43 to line 44. Line 44 is connected to the set terminal of flip-flop (F/F) 46. Flip-flop output line 48 is set to a preselected output voltage on such occurrence of a clock pulse on line 44, thereby enabling AND gate 50 to conduct clock pulses on line 52 through to line 54. Line 54 feeds counter 56, which is incremented in count once per received clock pulse. The delay circuit provides an optional means of delaying operation of the counter until the reflected pulse is about to arrive from the closest target point.

Figure 3:
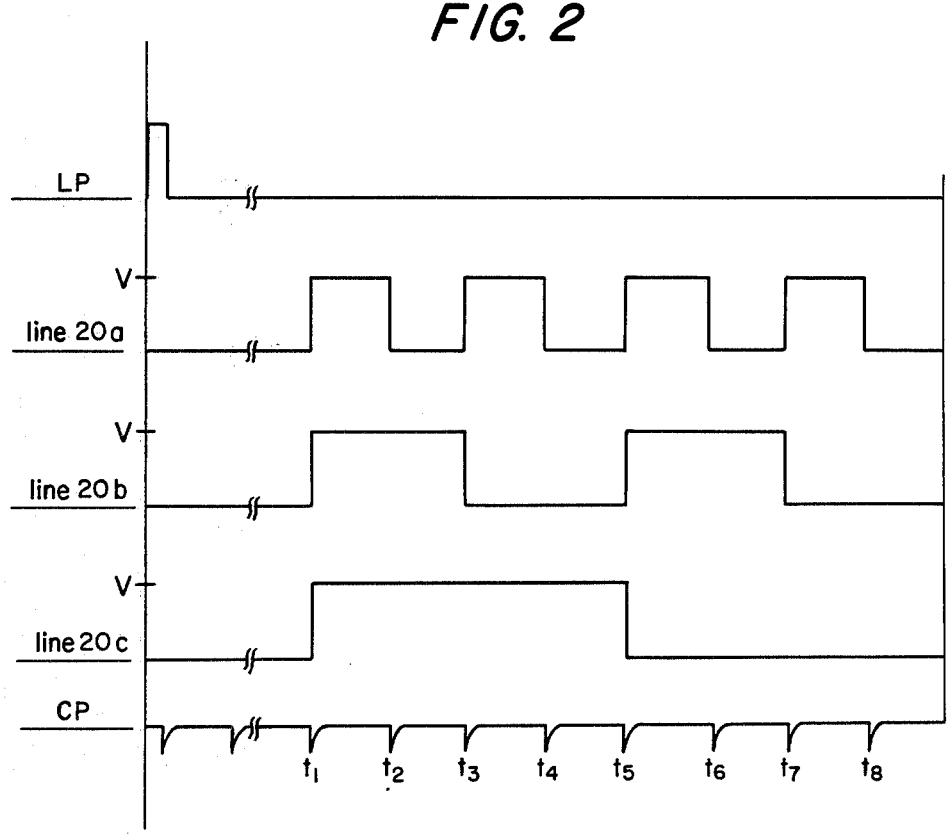
FIG. 3 is a timing diagram indicative of operation of the FIG. 2 apparatus.

Line 20a is connected to a counter stage which changes state on each counter-received clock pulse, as shown in FIG. 3. Line 20b is connected to a counter stage which changes state on every second counter-received clock pulse, as shown in FIG. 3. Line 20c is connected to a counter stage which changes state on every fourth counter-received clock pulse, as shown in FIG. 3. Successive clock pulses are shown as occurring individually at times $t_1$ through $t_8$. Counter 56 is self-resetting on receipt of the clock pulse at $t_8$ and thereupon applies a pulse to line 58, which resets flip-flop 46, thereby disabling gate 50 and rendering the FIG. 2 control circuitry inactive until recurrence of the line 38 start signal.

Collector 16 of FIG. 2 includes lenses 60, 62 and 64, having parallel closely-spaced respective optical axes 60a, 62a and 64a which are each rendered as closely coincident as possible with energy collecting axis CA. Shutters 66, 68 and 70 are associated respectively with lenses 60, 62 and 64 and may be comprised of known electrically-operable shutters such as, for example, a Kerr Cell or a Pockles Cell, or other rapid electronic or mechanical shuttering device. The shutters are open for transmission therethrough of radiant energy reflected into fields of view of their associated lenses during the periods of time in which the signals on lines 20a, 20b and 20c are at voltage level V in FIG. 3. The shutters otherwise are closed, preventing transmission therethrough. As will be appreciated by those skilled in the optical arts, shutters 66–70 may be positioned between lenses 60–64 and object 10, as an alternative to the FIG. 2 lens-shutter arrangement.

Considering FIGS. 1, 2 and 3 jointly, following issuance of laser pulse LP, line 54 receives clock pulses after a delay from the time of laser firing. Such pulses cycle line 20a to voltage V for the time periods $t_1$–$t_2$, $t_3$–$t_4$, $t_5$–$t_6$ and $t_7$–$t_8$. With corresponding cyclic shuttering activity of shutter 66, only that radiant energy reflected from spatially-spaced zones I, III, V and VII of object 10 will be applied to film frame 72 of recorder 24, the film frame being disposed in the focal plane of lens 60. By virtue of the lower periodicity of the line 20b signal, shutter 68 will function to conduct therethrough to film frame 74 only that radiant energy incident on lens 62 which is reflected from zones I and II and zones V and VI of object 10. Similarly, the still lower frequency line 20c signal will so operate shutter 70 that the output energy conducted therethrough to film frame 76 will constitute only that energy incident on lens 64 which is reflected from zones I through IV of object 10. A permutated selection/rejection of object-reflected radiant energy incident on collector 16 is thus accommodated. Beyond their energy transmission above-noted, shutter 66 rejects reflected energy corresponding to zones II, IV and VI, shutter 68 rejects reflected energy corresponding to zones III, IV and VII and shutter 70 rejects reflected energy corresponding to zones V, VI and VII. Based on the diverse periodicity and mutual overlap of the shutter-operating signals on lines 20a, 20b and 20c, a unique distinction attends the collected energy transmitted through the shutters from each zone, as may be defined by reference to the V- and zero-voltage portions of the shutter-operating signals taken together. Considering FIG. 3 and the V-voltage signal portion as a ONE (1) and the zero voltage portion as a ZERO (0), a code may be identified for energy reflected from, and hence for object surface points located in, each zone, as follows, readily upwardly in FIG. 3: zone I (111); zone II (110); zone III (101); zone IV (100); zone V (011); zone VI (010); and zone VII (001).

Figure 4:
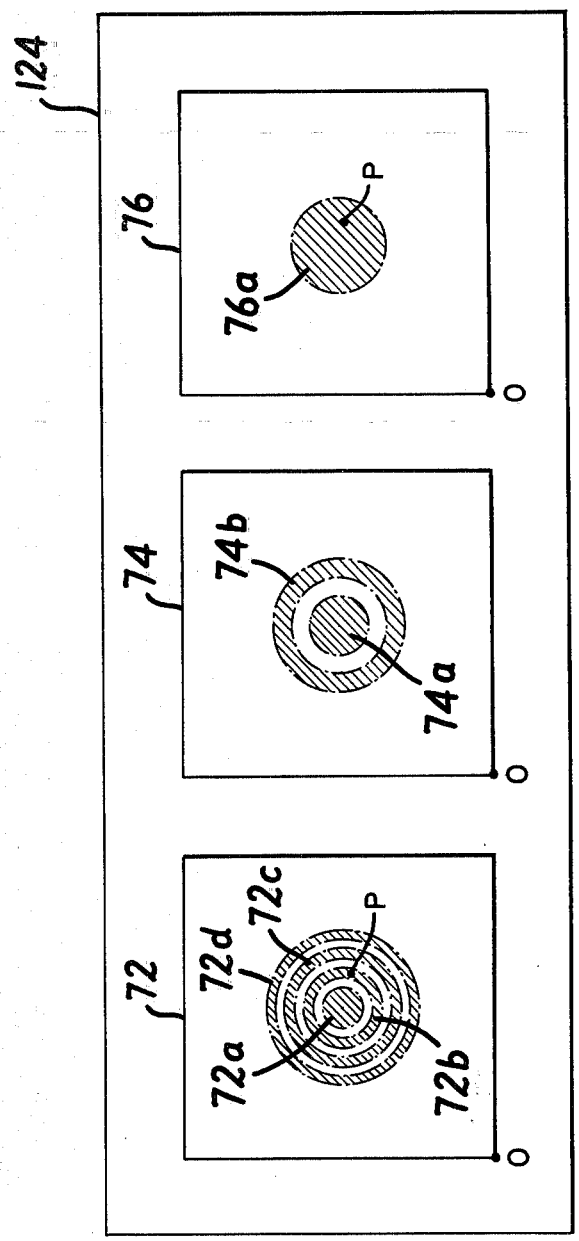
FIG. 4 illustrates a succession of photographic records of radiant energy collected by the FIG. 2 apparatus.

In the embodiment of the invention under present discussion, unit 24 as a recorder may comprise a plurality of unshuttered cameras, each exposing a distinct one of frames 72, 74 and 76. The film frames of such cameras, on development, will appear as is indicated in FIG. 4. Film frame 72, as shown by cross-hatching indicating film area exposed to radiant energy, has exposed areas 72a, 72b, 72c and 72d, corresponding to energy reflected from zones I, III, V and VII, respectively, of object 10. Film frame 74 includes exposed areas 74a and 74b, corresponding respectively to zones I and II and to zones V and VI of object 10. Film frame 76, includes exposed area 76a corresponding to zones I through IV of object 10.

Figure 5:
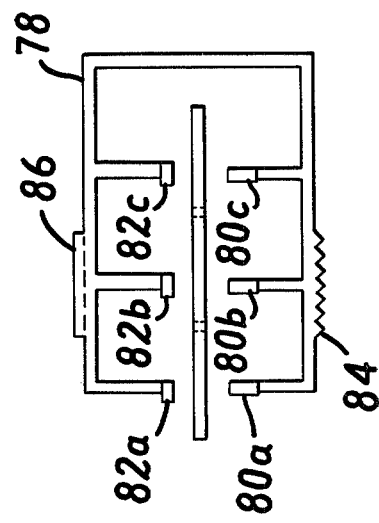
FIG. 5 shows an embodiment of a scanning mechanism for examining the records of FIG. 4.

Record processor 26 of FIG. 1 may employ apparatus such as is shown in FIG. 5 for examining the FIG. 4 records. Scanning mechanism 78 of FIG. 5 includes pencil-beam radiant energy sources 80a–80c, each arranged in fixed alignment with a corresponding one of radiant energy sensors 82a–82c to provide three source-sensor pairs. Developed film frames 72, 74 and 76 are commonly oriented and positioned collectively intermediate sources 80a–80c and sensors 82a–82c such that all source-sensor pairs are aligned at one time with the origin O (FIG. 4) or other common reference point of the associated film frame. Following such alignment, the film frames are fixedly positioned and the scanning mechanism is moved relative thereto. To this end, the scanning mechanism may include an x translation rack 84 and a y translation rack 86, each associated with a motor-driven pinion or the like operative to position the source-sensor pairs collectively on common film frame points other than that employed in alignment. x and y positional coordinate data signals may be generated, by conventional motor-responsive digitizing devices for each film frame point on which the source-sensor pairs are positioned. Where a sensor is unexcited for a given point being examined, the above-noted ONE condition applies since the film frame is exposed at such location. Conversely, where a sensor is excited by its corresponding source, the above-noted ZERO condition applies since the film frame is unexposed at such location. Unit 32 (FIG. 1) includes storage circuitry for common storage of both x, y film frame coordinates for a location being examined and the three-digit code established for such location from determination of the exposed or unexposed character of the film frames for the location. Each object point is evidenced at the same x, y coordinates of each film frame for all practical purposes based on the virtual coincidence of optical axes 60a–64a (FIG. 2) with collection axis CA and the extended distance between lenses 60–64 and object 10. Line 28 of FIG. 1 may comprise individual conductors, each connected to a distinct one of sensors 82a–82c.

Where unit 24 of FIG. 1 is constituted by the above-noted converter embodiment, sensors 88, 90 and 92 are disposed in place of film frames 72, 74 and 76 of FIG. 2, i.e., in the focal planes of lenses 60, 62 and 64, respectively, and the sensor output signals are applied to lines 34a, 34b and 34c for retention in storage unit 32. Sensors 88, 90 and 92 may each be comprised of an arrangement of photocells disposed in a matrix along mutually orthogonal axes whereby each photocell may identify a unique x, y location in the corresponding lens focal plane. In such embodiment, each of lines 34a, 34b and 34c will comprise the plurality of conductors connected to the photocells of the corresponding photocell matrix. Alternatively, a scanned vidicon, or other device such as a self-scanning solid state photocell array can be used whereby a single output line is employed. The voltage present on such single output line at a given time will correspond to the particular x, y location being scanned at that time. As will be evident to those skilled in the fiber optics arts, input ends of optical fibers may be disposed in the lens focal planes for communication of light therefrom to sensors disposed remotely from the focal plane and adjacent the output ends of such fibers.

In the alternate composite embodiment of collector and T/C controller shown in FIG. 6, collector 16' comprises a single shutter 94 controlled by input on line 20 and having associated lens 96. The lens axis 96a is directly coincident with collecting axis CA. A single unshuttered camera, having film frame 98 at the focal plane of lens 96, constitutes recorder 24 of FIG. 1. For this alternate embodiment, controller 18' includes gate circuit 36 and clock pulse generator 40, the gate circuit again being responsive, as in the FIG. 2 embodiment, to a start pulse on line 38 to issue a clock pulse on line 22 for laser triggering and also a delayed clock pulse on line 44. Line 44 terminates in the FIG. 5 embodiment also at the flip-flop 46 set input terminal. Other circuit components in FIG. 6 in common with FIG. 2, and above-discussed, include AND gate 50, counter 56 and connecting lines 48, 52, 54 and 58. Additional circuitry includes line 58a for conducting clock pulses from counter 56 to further counter 102, lines 104 for conducting signals indicative of counter 102 count to decoder 106 and lines 108a–c connected to AND gates 110, 112 and 114. Gates 110, 112 and 114 are fed by counter 56 over lines 116, 118 and 120, respectively.

In operation of the FIG. 6 embodiment, on occurrence of a start signal on line 38, lines 22 and 44 receive a clock pulse, respectively generating LP1 and setting flip-flop 46. The flip-flop remains set, thereby enabling gate 50, until reset by line 58 signal as in the FIG. 2 embodiment. Clock pulses conducted through gate 50 step counter 56. On the $t_1$ through $t_8$ clock pulses (FIG. 7), decoder 106 receives signals from lines 104 identifying a first, or reset, state of counter 102 and is responsive thereto to enable line 108a and hence gate 110. Line 116 cycles as shown in FIG. 7 and enabled gate 110 applies such signal to line 20c and thence line 20. Shutter 94 cycles correspondingly to open during time periods $t_1$–$t_2$, $t_3$–$t_4$, $t_5$–$t_6$ and $t_7$–$t_8$. Lines 20b and 20c remain at zero voltage level during this time period since decoder 106 maintains lines 108b and 108c inactive and gates 112 and 114 are disabled.

The first cycle ends at clock pulse $t_8$ when the pulse generated at line 58 resets flip-flop 46 and, in addition, via line 58a, causes counter 102 to advance to its next state. The film may now be advanced, or the photocell matrix or video data stored. Line 38 is again pulsed, giving rise to LP2 (FIG. 7). Counter 102 now furnishes a different count to decoder 106 which activates line 108b. Gate 112 is now enabled to conduct line 118 signals to line 20b, whereby shutter 94 is cycled to open during time periods $t'_1$–$t'_3$ and $t'_5$–$t'_7$, the time difference between times $t'_1$–$t'_3$ and $t'_5$–$t'_7$ corresponding respectively to the differences between times $t_1$–$t_3$ and $t_5$–$t_7$. Lines 108a and 108b are maintained inactive during this time by decoder 106, such that line 20 sees only the line 118 signal since gates 110 and 114 are disabled.

The second cycle ends at $t'_8$ with counter 102 again being incremented via the pulse on line 58a. Therefore when the film is advanced and line 38 is again pulsed, and counter 102 presents a new state to decoder 106 for activation of line 108c and deactivation of both lines 108a and 108b. The line 120 output of counter 56 is now applied through enabled gate 114 to line 20c and hence line 20.

Shutter 94 now is opened for time period $t''_1$–$t''_5$. The time difference $t''_1$–$t''_5$ corresponds to the time difference $t_1$-$t_5$. Following time $t''_8$, counter 56 resets to zero count and activates line 58, resetting flip-flop 46 and, over line 58a, applies a pulse to counter 102.

Referring again to FIG. 4, film frames 72, 74 and 76 will result identically in practice with the apparatus of FIG. 6. The film frames exist now, however, against a common film strip 124 which is advanced through the single unshuttered camera used in this practice.

By way of example of an especially preferred practice in accordance with the invention, assume it desired to spatially locate object surface point P in zone III of object 10 as shown in FIG. 1. The line of sight LSP (FIGS. 1 and 6), extends from lens node LN to point P. The spatial definition of line LSP is determinable, given the location of node LN and the spatial coordinates of the point in any of the film frames. The x and y coordinates are known from the x, y digitized outputs of the scanning mechanism. The z coordinate is known since the plane of residence of the film frame is known. The lens node position is determinable, if unknown, from practice set forth in commonly-assigned U.S. Pat. No. 3,936,649. Given the spatial location of line LSP, the zone location (zone III) is derived from the FIG. 5 scanning mechanism as the code 101, i.e., film frames 72 and 76 include the point whereas frame 74 does not include the point. The intersection of line LSP and the spatial plane identified by the code fully defines the unique location in three-dimensions of the point P.

The illustrative circuitry provides for definition of only seven object zones, i.e., $2^3$-1, yielding the three-digit code employed. This code may evidently be expanded by circuit modification to accommodate further digits and thereby increase object zone subdivisions. The applicable formula is $2^N$-1=P, where P is the number of subdivisions and N is the number of digits in the code. As will be appreciated, expansion of the code will involve expanding the number of lens-shutter arrangements in the FIG. 2 embodiment and additional light pulses in the FIG. 6 embodiment.

Incorporating reference is hereby made to the '052 patent, particularly in respect of the practice and system shown in FIGS. 6-7 thereof and attendant discussion in the '052 patent. Signals 46-48 of '052 FIG. 6 represent signals such as would correspond to radiant energy reflected by the zones of object 10 hereof. Signals (e) and (f) of '052 FIG. 6 are derived by subtraction and comparison of such signals ('052 FIG. 7) to precisely identify the actual bounds of such object zones akin to the definition of the actual extents of object surface irradiated through the masks of the '052 technique. Such signals (e) and (f) are used jointly with the foregoing code and positional coordinate signals to more precisely identify the spatial coordinates of points, as in the '052 patent.

Various changes and modifications may be introduced in the apparatus and practices discussed above without departing from the spirit and scope of the invention. The invention accordingly contemplates the use of any form of radiant energy and the use of codes other than the above-discussed code, including the shift register-generated codes of the '052 patent above, for zone/plane identification. While respective different time patterns for energy collection are achieved above by respective different shutter operating rates, a common rate may be employed with phasing different for each separate collection, as by time-shifting a common time pattern.

What is claimed is:

1. In the method for determining the spatial location of points on the surface of an object by identifying a spatial line of sight to the point and the location of said point along said line of sight, the improvement wherein blanket radiant energy is projected onto the entirety of such object surface, and collections of radiant energy reflected by respective sets of one or more zones of said object surface, each of such sets having a zone overlapping a zone of another set and one or more of said sets including zones encompassing less than the entirety of said object surface, are made separately in accordance with respective time patterns which are mutually overlapping in time determined with respect to such radiant energy projection.

2. The invention claimed in claim 1 wherein said radiant energy is projected onto said object surface in a single pulse and wherein such collections are made in a common time period after such single pulse projection.

3. The invention claimed in claim 1 wherein said radiant energy is projected onto said object surface in plural time-spaced pulses and wherein each such collection is made individually during the time period following a different such pulse.

4. The invention claimed in claim 1 including the further step of making records of such collected radiant energy.

5. The invention claimed in claim 1 wherein such projected radiant energy is light energy.

6. A method for use in determining the spatial location of a point on the surface of an object, comprising the steps of:
    (a) establishing a lens field of view inclusive of at least a portion of such object surface including said point; then
    (b) projecting pulsed radiant energy onto such object surface portion; and then
    (c) separately collecting radiant energy reflected into said lens field of view by respective sets of one or more zones of said object surface portion, each of said sets having a zone overlapping a zone of another set and one or more of said sets including zones encompassing less than the entirety of said object surface such collections being made in accordance with respective different time patterns which are mutually overlapping in time determined with respect to such radiant energy projection.

7. The method claimed in claim 6 wherein said step (b) is practiced by projecting a single pulse of radiant energy and wherein said collections of reflected radiant energy in said step (c) are made in a common time period after such single pulse projection.

8. The method claimed in claim 6 wherein said step (b) is practiced by plural time-spaced projections each of a single pulse of radiant energy and wherein each said collection of reflected radiant energy in said step (c) is made individually during a time period following a different such pulse.

9. The invention claimed in claim 6 including the further step of making records of such collected radiant energy.

10. The invention claimed in claim 9 including the further step of generating a signal indicative both of the number of said records made and of those of said records which include said surface point.

11. In combination:
    (a) transmitter means operable for generating a pulse of radiant energy;

(b) lens means for receipt of such radiant energy reflected by an object surface;
(c) shutter means operable for conduction therethrough of such lens means received radiant energy; and
(d) control means for operating said transmitter means and for thereafter selectively operating said shutter means to effect separate collections of the received radiant energy reflected by respective sets of one or more zones of said object surface, each of said sets having a zone overlapping a zone of another set and one or more of said sets including zones encompassing less than the entirety of said object surface, such collections being made in accordance with respective different time patterns which are mutually overlapping in time established with respect to such generation of said pulse of radiant energy.

12. The invention claimed in claim 11 wherein said lens means comprises a plurality of lenses and wherein said shutter means comprises a shutter for each such lens, said control means operating said transmitter means for generation of a single pulse of radiant energy and jointly operating such shutters in accordance with respective different time patterns during a common time period following generation of said pulse.

13. In combination:
(a) transmitter means operable for generating successive pulses of radiant energy;
(b) lens means for receipt of such radiant energy of said pulses reflected by an object surface;
(c) shutter means operable for conduction therethrough of such lens means received radiant energy; and
(d) control means for operating said transmitter means and for thereafter selectively operating said shutter means to effect separate collections of the received radiant energy reflected by respective sets of one or more zones of said object surface, each of said sets having a zone overlapping a zone of another set and one or more of said sets including zones encompassing less than the entirety of said object surface, said collections being made in accordance with different time patterns in respective different time periods, each such time period following generation of a distinct one of said pulses.

* * * * *